Patented Nov. 29, 1932

1,889,078

UNITED STATES PATENT OFFICE

MAXIMILIAN SCHIECHEL, OF FRANKFORT-ON-THE-MAIN, GERMANY, ASSIGNOR TO AMERICAN LURGI CORPORATION, OF NEW YORK, N. Y., A CORPORATION OF NEW YORK

FLOTATION PROCESS

No Drawing. Application filed February 7, 1931, Serial No. 514,315, and in Germany February 19, 1930.

This invention relates to a flotation process. It is known that, in the case of flotation processes, or flotation apparatus, in which air is forced into the ore slimes which are to be concentrated, through porous materials (filter cloth, porous walls of earthenware, glass, rubber and the like) for the purpose of producing a foam of very fine bubbles, the said microporous materials become clogged or choked in course of time.

Such clogging occurs particularly in cases where the ore slimes contain large quantities of colloidal substances (clay, potter's clay and the like), or where lime is employed as flotation reagent. Clogging constitutes a drawback to this flotation process, since when the filtering material is choked, the process has to be interrupted, in order to cleanse the filtering materials by a thorough washing.

The clogging of the microporous substances is explainable as follows:

Although air is continuously blown through the microporous material from the air space to the space occupied by the ore slimes, the slimes penetrate into the porous material as the result of capillary action. The air passing through, however evaporates the water of the indrawn slimes, leaving the jointly indrawn particles of lime and clay behind in the porous material.

This operation proceeds continuously that is to say, ore slime is drawn into the porous material all the time, and the water of the slime is evaporated. In this way, the lime and clay particles accumulate progressively in the porous material and may finally result in the latter becoming completely choked up.

The present invention aims at obviating the foregoing drawback. To this end, according to the invention, fresh water or an aqueous solution is introduced in small quantities, continuously or at intervals into the air space along with the air. In this manner, water is continuously forced with the air, through the filter cloth which also becomes completely moistened with water inside and the capillary attraction of the filter cloth is thereby neutralized. Colloidal particles (lime, potter's clay, clay) are no longer drawn into the filter cloth, but are continuously washed back into the ore slimes by the fresh water trickling through from the air space into the slimes space, or in the event of an aqueous solution of a chemical being employed, are wholly or partially dissolved and consequently removed.

According to the construction of the flotation apparatus, the water may be injected or atomized in a cold or warm condition, into the air chambers of same, or admitted in the form of steam.

The invention has still another advantage. If, as heretofore, air alone is forced through the filtering material remains perfectly dry, being moistened only on the side next the ore slimes. If, however, water or the like be forced through along with the air, the material is moistened throughout, so that the air is more uniformly distributed and still finer air bubbles are produced.

I claim:—

1. In a flotation process wherein air is forced through microporous materials into the ore pulp under treatment for the purpose of producing a foam of very fine bubbles, the improvement which comprises forcing a small amount of aqueous liquid through the microporous material along with the air.

2. In a flotation process wherein air is forced through microporous materials into the ore pulp under treatment for the purpose of producing a foam of very fine bubbles, the improvement which comprises forcing a small amount of water through the microporous material along with the air.

3. In a flotation process wherein air is forced through microporous materials into the ore pulp under treatment for the purpose of producing a foam of very fine bubbles, the improvement which comprises intermittently forcing a small amount of aqueous liquid through the microporous material along with the air.

In testimony whereof, I affix my signature.

MAXIMILIAN SCHIECHEL.